US007068757B1

(12) United States Patent
Burnett (10) Patent No.: US 7,068,757 B1
(45) Date of Patent: Jun. 27, 2006

(54) APPARATUS AND METHOD FOR AUTOMATED TESTING OF THE QUALITY OF VOICE COMMUNICATIONS OVER DATA NETWORKS

(75) Inventor: Charles J Burnett, Colorado Springs, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/556,503

(22) Filed: Apr. 24, 2000

(51) Int. Cl.
*H04M 3/22* (2006.01)

(52) U.S. Cl. .................... 379/29.01; 379/29.06

(58) Field of Classification Search ............ 379/29.01, 379/12, 22.01, 22, 26.01, 28, 27.04, 9.06, 379/29.06; 370/241, 249
See application file for complete search history.

(56) References Cited

U.S. PATENT DOCUMENTS

| | | | |
|---|---|---|---|
| 4,258,236 A | | 3/1981 | Conklin et al. ....... 179/175.3 R |
| 5,539,321 A | * | 7/1996 | Sciacero et al. ............ 324/540 |
| 5,553,059 A | * | 9/1996 | Emerson et al. ............ 370/248 |
| 5,825,849 A | * | 10/1998 | Garland et al. ........ 379/106.09 |
| 5,875,398 A | * | 2/1999 | Snapp ....................... 375/224 |
| 5,901,202 A | * | 5/1999 | Lam |
| 6,002,671 A | * | 12/1999 | Kahkoska et al. |
| 6,154,523 A | * | 11/2000 | Hofmann et al. ........... 370/249 |
| 6,185,191 B1 | * | 2/2001 | Dipperstein |
| 6,519,323 B1 | * | 2/2003 | Hardy et al. ............. 379/29.01 |
| 6,640,318 B1 | * | 10/2003 | Qiu et al. ..................... 714/43 |

FOREIGN PATENT DOCUMENTS

| | | |
|---|---|---|
| EP | 144072 B1 | 11/1984 |
| EP | 881855 A2 | 12/1998 |

* cited by examiner

*Primary Examiner*—Barry Taylor (57) ABSTRACT

A slave test unit is used in conjunction with a remote test unit to test voice signal quality parameters, such as clarity, delay and echo. A remote master test unit, or a remote slave test unit, controls the slave test unit via commands sent by the remote test unit over a phone connection established by the remote test unit. Such a system of test units eliminates the need for a human test operator to be present at the location of the slave test unit. The inclusion of a "dialback" capability in the slave test unit allows a remote test unit to instruct the slave test unit to call back the remote test unit, thus allowing voice quality tests to be performed over a phone connection that has been initiated by the slave test unit. This capability is advantageous in voice quality testing over phone connections involving a digital data network, since the path of the connection through a data network is typically determined by the location of the origination of the call.

26 Claims, 6 Drawing Sheets

APPARATUS AND METHOD FOR AUTOMATED TESTING OF THE QUALITY OF VOICE COMMUNICATIONS OVER DATA NETWORKS

BACKGROUND OF THE INVENTION

Although digital data networks have existed for many years, an important use of such networks that has risen in popularity recently is the transmission of voice traffic. Such networks employ a "packet-switched" connection, whereby voice signals are broken down into discrete portions, or "packets," which are transported across the network to the appropriate destination, where the packets are then reassembled. As a result, unlike a standard telephone "circuit-switched" network, whereby an entire physical connection must be maintained between the parties of a one-on-one conversation for the duration of a phone call, digital data networks are not required to maintain such a complete physical connection at any point during the conversation. Each of the packets traversing such a network during a conversation can safely arrive at its destination without all of the packets being required to travel along an identical route in a contiguous fashion. Thus, data networks allow greater flexibility in establishing and maintaining voice connections than standard analog phone networks.

Use of a digital data network for voice communications also allows bandwidth to be saved in a way not available to analog phone networks. Voice calls typically include a significant amount of time when little or no useful audio information is being transmitted. By not transmitting packets during these times, a digital data network can save communication bandwidth that would otherwise be allocated to that call, thus allowing more such calls to be handled by the network at any one time.

On the other hand, dividing a voice transmission into packets also introduces potential problems that are nonexistent in circuit-switched systems. For example, since the packets are being transmitted over a digital network, the original analog voice signal must be converted into a digital data format, and then converted back to an analog signal prior to being received by the listener. Such transformations can possibly degrade the original signal in ways not encountered over an analog, circuit-switched network. Also, due to the nature of the interfacing circuitry between the digital network and the analog portions of the communication path, an unwanted "echo" of the voice signal may be generated. Furthermore, considering that the entire communication path is not allocated end-to-end for the duration of the conversation, "latency," or source-to-destination delay, may be encountered. Additionally, in periods of heavy traffic in the data network, occasional interruptions in the delivery of the voice signal to the destination may also occur. Any of these problems could cause a noticeable decrease in the quality of service expected by most customers.

Given the types of problems that may occur with the transmission of voice signals over digital data networks, proper testing of such networks with respect to voice signals is vital. Many types of electronic equipment exist that test various aspects of communication, including both analog voice and digital data transmissions. Likewise, with the fairly recent advent of voice transmission over digital networks, some voice quality test systems have been devised. Some of these test systems are capable of executing complex testing algorithms to measure various aspects of the voice quality delivered by a packet-switched digital data network. Many of these systems are necessarily expensive, requiring a PC-like interface, possibly including monitor and keyboard devices, to allow the test system user to control the testing process.

To fully test a voice call over a digital data network, tests should be performed on calls that are initiated from either end of the connection. Tests performed in this manner are important since the path that voice packets travel through a data network is often determined in part by the location of the origination of the call. Since different paths can yield different voice quality measurements, the ability to initiate calls in either direction is crucial to duplicating "real-world" conditions. Currently, to perform such tests, two test systems, with a human operator directly controlling each system, must be involved in the test (one at each end of the communication path being tested), resulting in a costly and cumbersome solution.

Thus, it would be advantageous to perform thorough voice quality testing over digital data networks without having to utilize two test systems that both require local test operator intervention. Additionally, it would be a benefit to be able to perform such testing over phone connections, neither end of which is occupied by an operator, allowing testing of connections that are completely remote from the human test system operator.

SUMMARY OF THE INVENTION

The embodiments of the invention, to be discussed below, provide a way to perform voice quality testing over digital networks by cooperating with a remote "master" test unit, which is directly controlled or programmed locally by a human test operator. In one embodiment of the invention, a "slave" test unit performs tests based on guidance from a master test unit, whereby the master and slave units are connected to opposite ends of a telephone communication channel to be tested. Such a slave test unit does not require a human operator for control or guidance; instead, the slave executes test commands issued by the master test unit. The master unit initially calls the slave over a phone line, and, after the connection is made, issues commands for the slave to decode and execute via electrical signals. These commands are typically themselves tests that the master unit would normally execute, such as the sending and analyzing of electrical test signals, analysis of collected test data, and other test functions. The slave can also return status of previously executed commands to the master for presentation to the master test unit operator. Without the need for direct human operator intervention of the slave unit, labor costs are reduced. As a result, the slave unit also does not require any human interface circuitry or software, thus providing a further cost reduction to the overall test system.

In one embodiment of the invention, the slave has the ability to perform functions that are normally identified with a master test unit. An important example of such a function is "dialback," in which the slave test unit is capable of calling the master unit back on a separate phone line. An important advantage of the dialback capability is that tests can be executed on a connection for a call that was originated by either the master or slave unit. This capability is important since the path taken by the packets of the voice signal is frequently determined by the location of the origination of the call. In other words, packets for calls placed from "point A" to "point B" are likely to take a different path from those placed from "point B" to "point A". Additionally, with two phone connections being used between the master and slave units, a variety of configurations involving the transfer of command, status, and test signals can be devised.

For example, one connection can be used solely for test signals, while the other is used for command and status transfer. The roles of the two connections can then be reversed so that the opposing phone connection may be tested.

Other phone test commands, such as "loopback" and "quiet termination", for example, can also be incorporated into the slave test unit. Test units with loopback capability can return an incoming voice test signal without significant modification of the signal so that the initiating test unit can check for changes in the signal as a result of the round-trip transmission of the signal. Quiet termination is the ability to generate no outgoing signals, which allows the test unit providing the termination to eliminate itself as a potential source of voice signal problems, such as echo. As a result, the test unit transmitting the test signal can then analyze the returning signal for the presence of echo and other unwanted noise.

In another embodiment, the slave test unit possesses the ability to pass commands and status between a master test unit and a remote slave test unit. This particular functionality allows the voice quality testing of phone connections to which the master test unit is not directly a party. Expanding upon this capability, testing of many different phone lines could be initiated, controlled and analyzed using only one master test unit and operator, limited only by the number and location of slave test units involved.

Another embodiment of the invention is a method of testing the voice signal quality of a phone connection by establishing such a connection with one or more remote master or slave test units, receiving test commands over the phone connection that are encoded in electrical signals received from the remote test units, decoding those test commands, and then executing them appropriately.

It will be recognized by those of skill in the art that, although the embodiments of the invention were developed primarily for the purpose of testing voice signal quality over digital data networks, the quality of such signals may also be tested over normal analog phone lines using the same embodiments.

Other aspects and advantages of the invention will become apparent from the following detailed description, taken in conjunction with the accompanying drawings, illustrating by way of example the principles of the invention.

DETAILED DESCRIPTION

Figure 1:
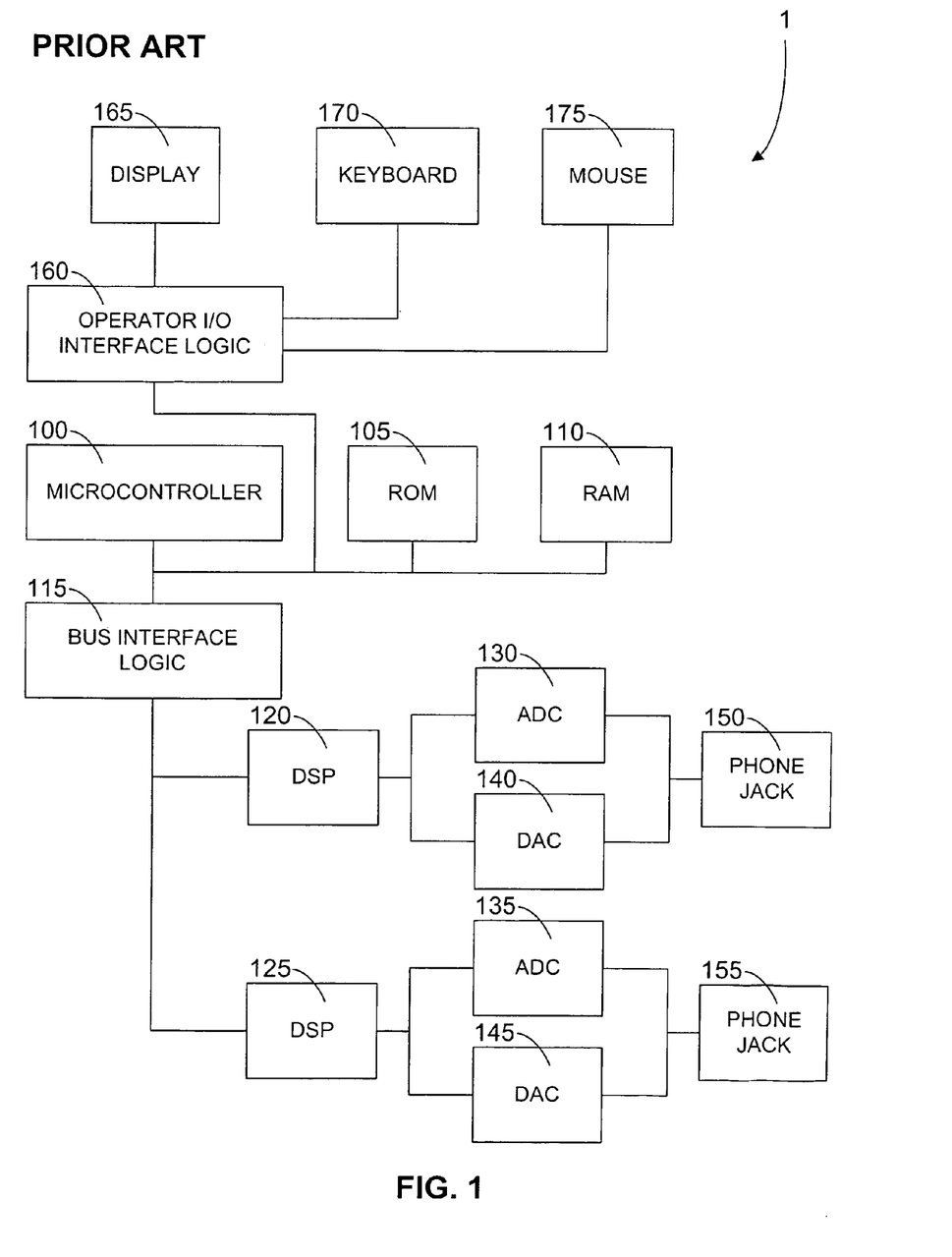
FIG. 1 is a block diagram of a possible master test unit.

To provide a basis for discussion, the block diagram of FIG. 1 depicts an example of a master test unit 1 from the prior art. This particular test unit is used for voice quality testing over connections involving FXO/FXS (Foreign Exchange Office/Foreign Exchange Station) phone lines. (Other types of phone connections, such as E&M ("Ear and Mouth"), are also possible.) In this case, the master employs a microcontroller 100, with ROM 105 and RAM 110, to provide supervisory control of the test unit. Microcontroller 100 also provides all input and output services between a human test operator and the master test unit by way of a display device 165, a keyboard 170, and a mouse 175. Master test unit 1 utilizes a collection of operator interface logic 160 to allow communication between microcontroller 100 and the devices used to communicate with the test operator. To connect with the phone network to be tested, master test unit 1 incorporates two phone jacks 150 and 155, which are, in turn, connected to a pair of analog-to-digital converters (ADCs) 130 and 135, and a pair of digital-to-analog converters (DACs) 140 and 145. ADC/DAC pair 130/140 is also connected to a digital signal processor (DSP) 120, while ADC/DAC pair 135/145 is connected to DSP 125. Each of DSPs 120 and 125 are also connected to microcontroller 100 via a collection of bus interface logic 115 that allows microcontroller 100 and DSPs 120 and 125 to communicate. DSPs 120 and 125 are used to generate digital voice test signals (as well as test commands, as discussed later), which are then converted to analog electrical signals by DACs 140 and 145 prior to being transferred via phone jacks 150 and 155 over the phone network. Conversely, DSPs 120 and 125 are capable of analyzing voice test signals (as well as status signals) received by phone jacks 150 and 155 via ADCs 130 and 135. As can be seen in the art of general telephone testing, two phone connections are often available in a telephone test unit to allow the test unit to "call itself" to perform tests without the benefit of any additional hardware. In this master test unit, phone jacks 150 and 155, along with the circuitry attached to each, can utilize that capability as well.

Figure 2:
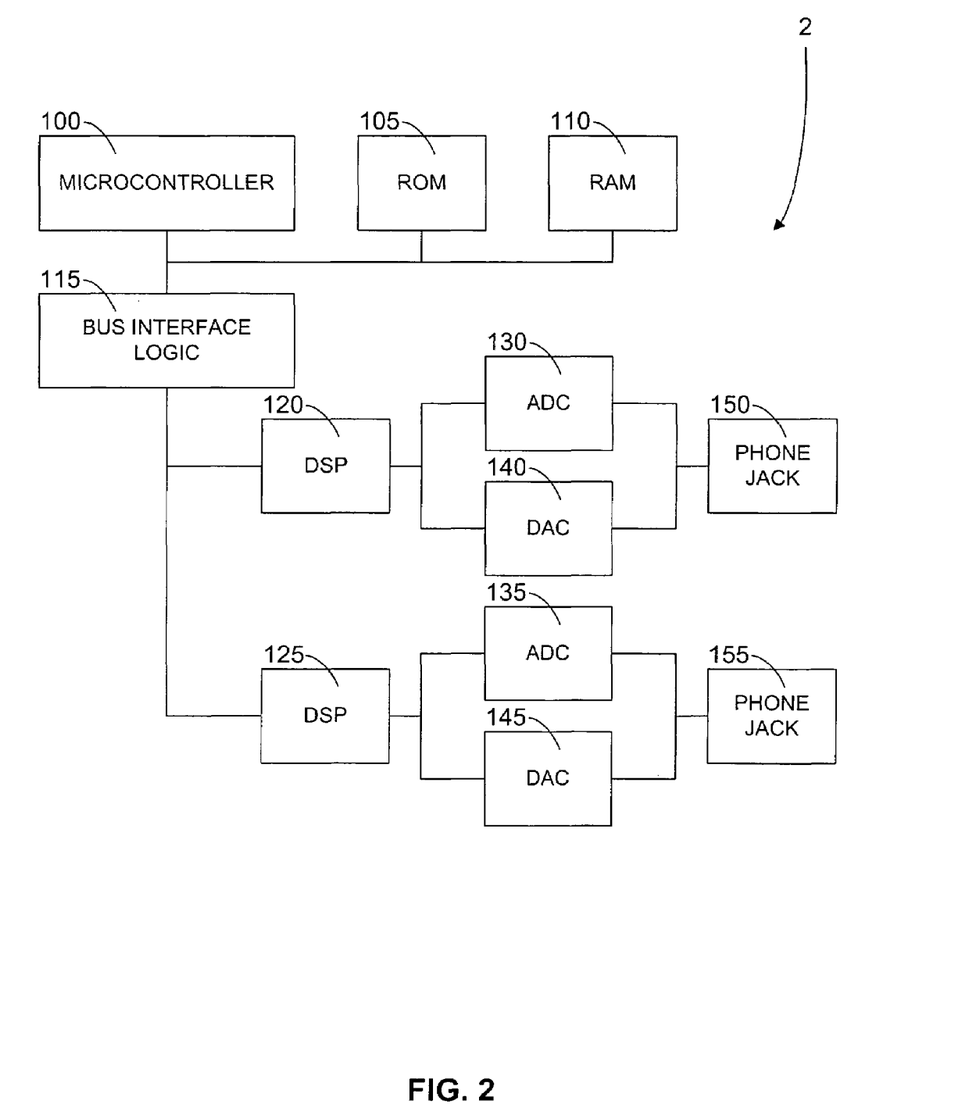
FIG. 2 is a block diagram of a slave test unit according to an embodiment of the invention.

Phone jacks 150 and 155 are also used to connect the master test unit with a slave test unit, an embodiment of which is shown in FIG. 2. As can be seen in that diagram, slave test unit 2 represents a reduction of the hardware for master test unit 1 from FIG. 1. More specifically, slave test unit 2 contains essentially the same hardware as master test unit 1, with the exception of the user interface hardware (operator I/O interface logic 160, display 165, keyboard 170, and mouse 175), which have been removed. Such hardware is not necessary since slave test unit 2 does not require a direct human operator, instead receiving and decoding test commands to execute from a master test unit such as that shown in FIG. 1. In one embodiment, a small amount of additional firmware, stored within ROM 105 and executed by microcontroller 100 and DSPs 120 and 125, is used within slave test unit 2 to enable the receiving and decoding of the test commands transmitted by master test unit 1. (Similarly, master test unit 1 includes firmware within ROM 105 that allows the generating and transmitting of commands to slave test unit 2.) Considering the expensive nature of the operator interface, a significant cost savings results in the use of a slave test unit over a master test unit.

Additional savings in terms of design, development and tooling costs would result from the use of slave test unit 2 since a majority of the hardware and firmware design of master test unit 1 may be leveraged to generate test unit 2. Of course, this is not a requirement of the invention; any slave unit that can interpret commands and test signals from a master test unit, as well as send status and test signals that are applicable to that same master unit, will suffice. The manner of how the hardware and firmware of the slave unit are derived is not a necessary limitation of the invention.

Figure 3:
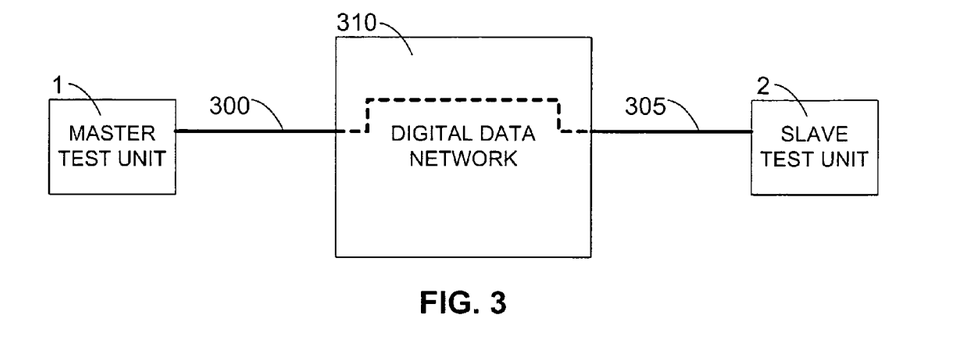
FIG. 3 is a block diagram of a test system configuration involving a master test unit, and a slave test unit according to an embodiment of the invention, using a single phone connection.

Concerning the operating environment of slave test unit 2, FIG. 3 displays a possible testing system utilizing an embodiment of the invention consisting of master test unit 1 (shown in FIG. 1) connected to slave test unit 2 (shown in FIG. 2) via standard phone lines 300 and 305 and digital data network 310. Both units may reside at phone customer sites, although other locations, such as a telephone central office, are also contemplated. Due to the advantageous lack of user interface hardware, slave test unit 2 may be installed out of plain view, such as, for example, in a telephone wiring closet on the customer premises. The connection between master test unit 1 and slave test unit 2 is generally made by a telephone call from master 1 to slave 2, the call being initiated either directly by the test operator controlling master 1, or automatically by way of microcontroller 100 within master 1.

Once the phone connection via phone lines 300 and 305, and digital data network 310, has been established, transmission of command and status information between master 1 and slave 2 can occur. In one embodiment, dual-tone, multi-frequency (DTMF) signals normally associated with tone dialing are used to transfer command and status information between master 1 and slave 2. The advantage of using DTMF is that its use as a method of information interchange is pervasive in telecommunications. Thus, such a system of communication would have applicability on a vast number of telephone systems. However, other types of information transport methods may be used in other embodiments of the invention.

With the ability to communicate with master test unit 1, slave test unit 2 is capable of performing all testing and analysis functions requested by the connected master slave unit 1. Such functions include, but are not limited to, quiet termination and loopback, as discussed earlier. Such functions allow master test unit 1 to transmit various audio test signals that check for voice signal quality. Parameters associated with voice signal quality that may be tested include, but are not limited to, clarity, delay (or latency), and echo, as described earlier.

Using quiet termination functionality as an example, slave test unit 2 allows master test unit 1 the ability of testing the various parameters in which a test operator would be interested along an entire phone connection without the need for a second operator at the slave end of the line. For example, the echo characteristics of the connection may be tested by master test unit 1 first placing slave test unit 2 into quiet termination mode via an appropriate test command, and then generating and transmitting an audio signal onto the line toward slave test unit 2. Any portion of the test signal returned over the phone connection to master test unit 1 would provide the test operator with an indication of the amount of echo being generated by sources other than slave test unit 2.

In a similar fashion, the ability of slave test unit 2 to provide a loopback function allows master test unit 1 to measure the clarity and delay of the connection between the two units. Once master test unit 1 places slave test unit 2 into loopback mode by way of a test command, voice test signals from master 1 will be returned from slave 2 substantially as they are received by slave 2, allowing master 1 to perform delay and clarity measurements on the test signals it has produced.

With the hardware and firmware capabilities of master 1 and slave 2 closely aligned, other functions that are primarily the province of master 1 may be performed by another embodiment of slave 2. For example, slave 2, at the prompting of master 1, is capable of generating voice test signals and analyzing the resulting signal returned from master 1 while master 1 has placed itself in loopback or quiet termination mode. In effect, the roles previously assumed by master 1 and slave 2 are reversed. Slave 2 then transmits any test results over the phone connection to master 1 for ultimate analysis by the test operator.

Figure 4:
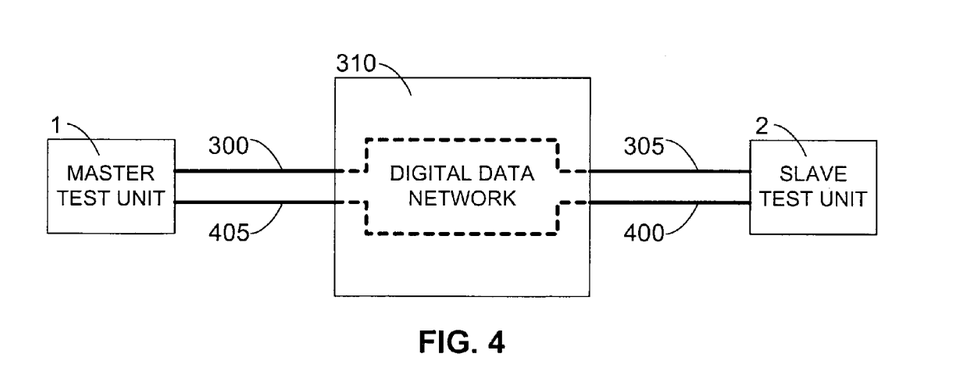
FIG. 4 is a block diagram of a test system configuration involving a master test unit, and a slave test unit according to an embodiment of the invention, using two separate phone connections.

In another embodiment of the invention, slave test unit 2 possesses a dialback capability, whereby master test unit 1 informs slave test unit 2 to call master 1 back to facilitate a second, separate phone connection between the two units. This second connection is accomplished via phone lines 400 and 405 and digital network 310, as shown in FIG. 4, in addition to the previously mentioned first connection of phone lines 300 and 305, with network 310. As stated earlier, the location of the origination of a call typically determines the path of the call through a digital data network. As a result, the dialback capability of slave test unit 2 provides the ability to test calls that would originate at the remote location of slave 2. Once the second phone connection has been made, any combination of voice quality tests can be performed from either master 1 or slave 2 on either line. Therefore, this embodiment of slave 2 provides the operator of master 1 the ability to determine the overall voice quality over phone connections between master 1 and slave 2, regardless of which end originated the call, with only one test operator performing the test.

Figure 5:
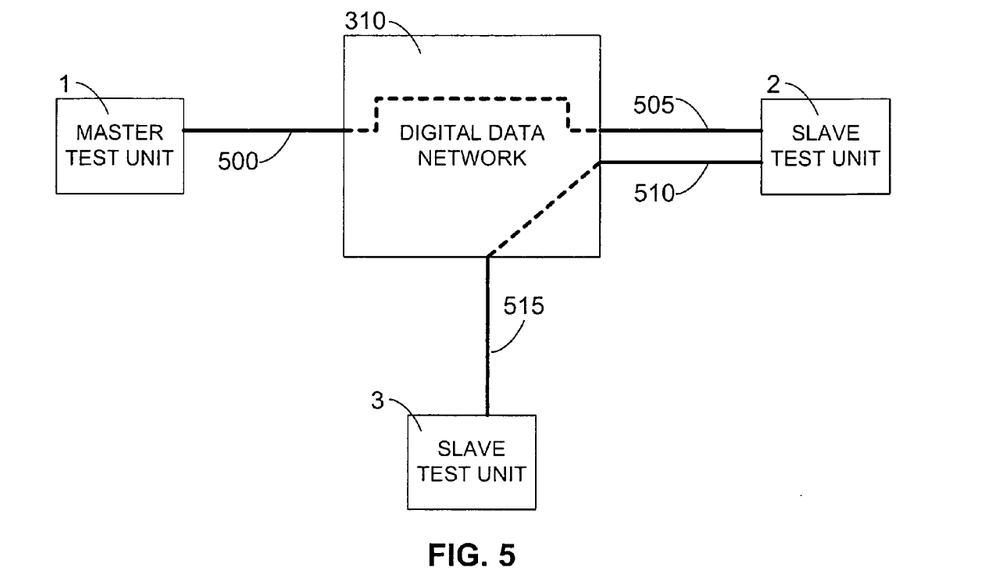
FIG. 5 is a block diagram of a test system configuration involving a master test unit, and two slave test units according to an embodiment of the invention, for testing a single phone connection between the two slave test units.
Figure 6:
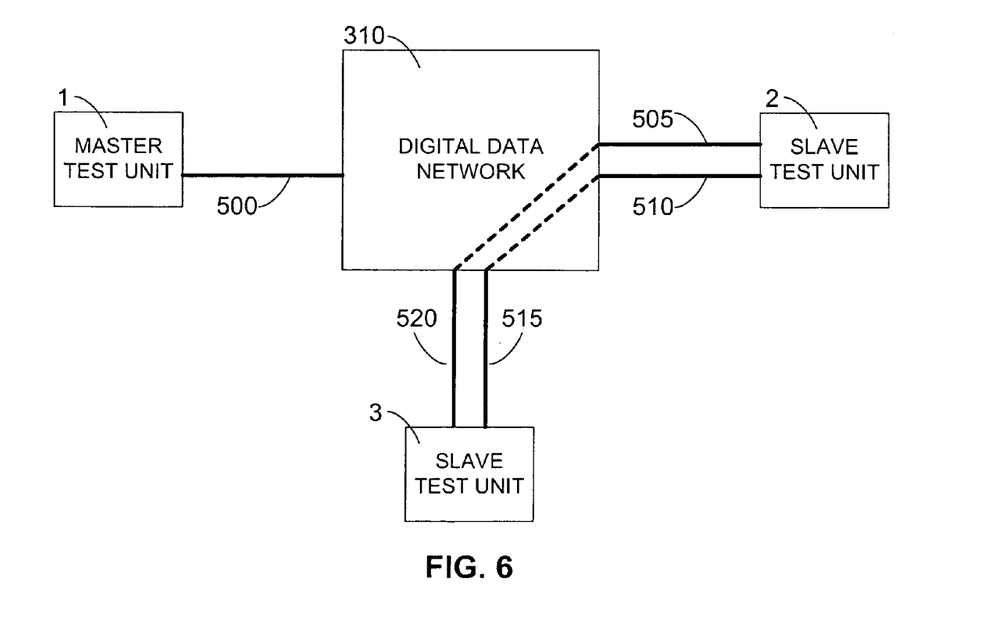
FIG. 6 is a block diagram of a test system configuration involving a master test unit, and two slave test units according to an embodiment of the invention, for testing two separate phone connections between the two slave units.
Figure 7:
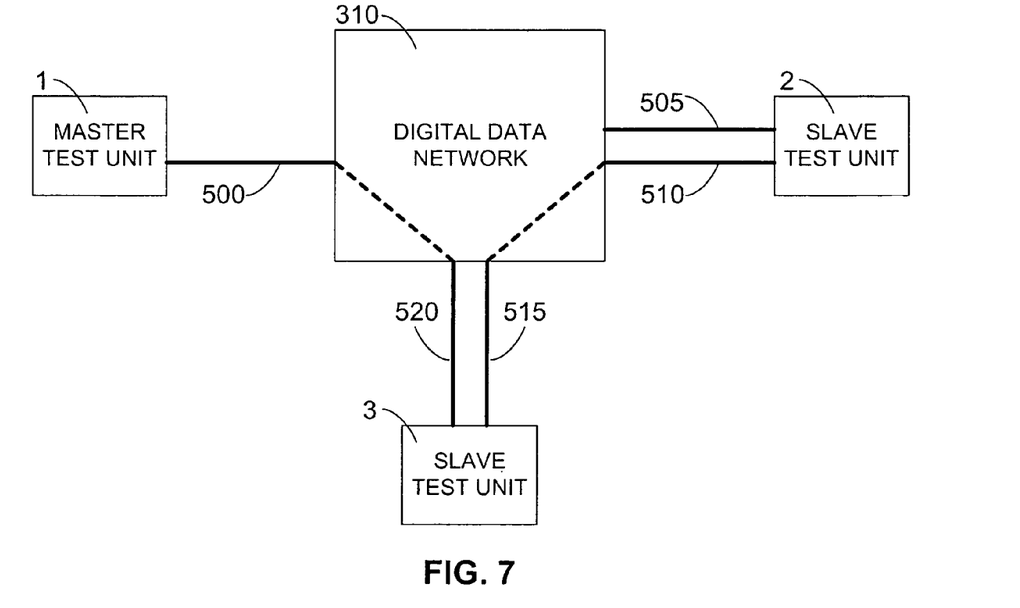
FIG. 7 is a block diagram showing the test system configuration of FIG. 6 after a slave test unit according to an embodiment of the invention has reconnected with a master test unit for command and status communication.

In other embodiments, the testing capabilities of the system are extended further to allow testing of phone connections of which master test unit 1 is not a party. For example, as shown in FIG. 5, master test unit 1 initiates the entire test process by calling a first slave test unit 2 over phone lines 500 and 505, along with digital data network 310. Master 1 then issues instructions to slave 2 to use its dialback capability to call a second slave test unit 3 over phone lines 510 and 515, and network 310. (First slave test unit 2 and second slave test unit 3, as shown in FIGS. 5, 6, and 7, are identical units, an embodiment of which is shown in FIG. 2.) Master 1 may then issue commands to first slave 2 to perform tests on the communication path between first slave 2 and second slave 3. Results of the tests as compiled by first slave 2 or second slave 3 are then transmitted back to master 1 over the established phone connections.

If testing on two separate phone connections between first slave 2 and second slave 3 is desired, it is possible for first slave 2 to terminate the connection between itself and master 1 to allow second slave 3 to call back first slave 2 with a second phone connection. As shown in FIG. 6, first slave 2 drops the connection with master 1 so that a new connection may be made by second slave 3 initiating a connection with first slave 2 via phone lines 520 and 505, using digital data network 310. All testing between first slave 2 and second slave 3 then progresses in the same manner using two separate phone connections as described earlier between master 1 and first slave 2. After completion of the testing, either first slave 2 or second slave 3 returns status and any resulting test data to master 1 after terminating one of the phone connections between first slave 2 and second slave 3, and then calling master 1. For example, FIG. 7 depicts the situation where second slave 3 drops the second connection with first slave 2 in order to establish a connection with master 1 via lines 500 and 520 via network 310. In another embodiment of the invention, the termination and reestablishment of the connection with master 1 could be avoided by the use of a third telephone port in first slave 2, albeit at the expense of increased hardware cost.

Figure 8:
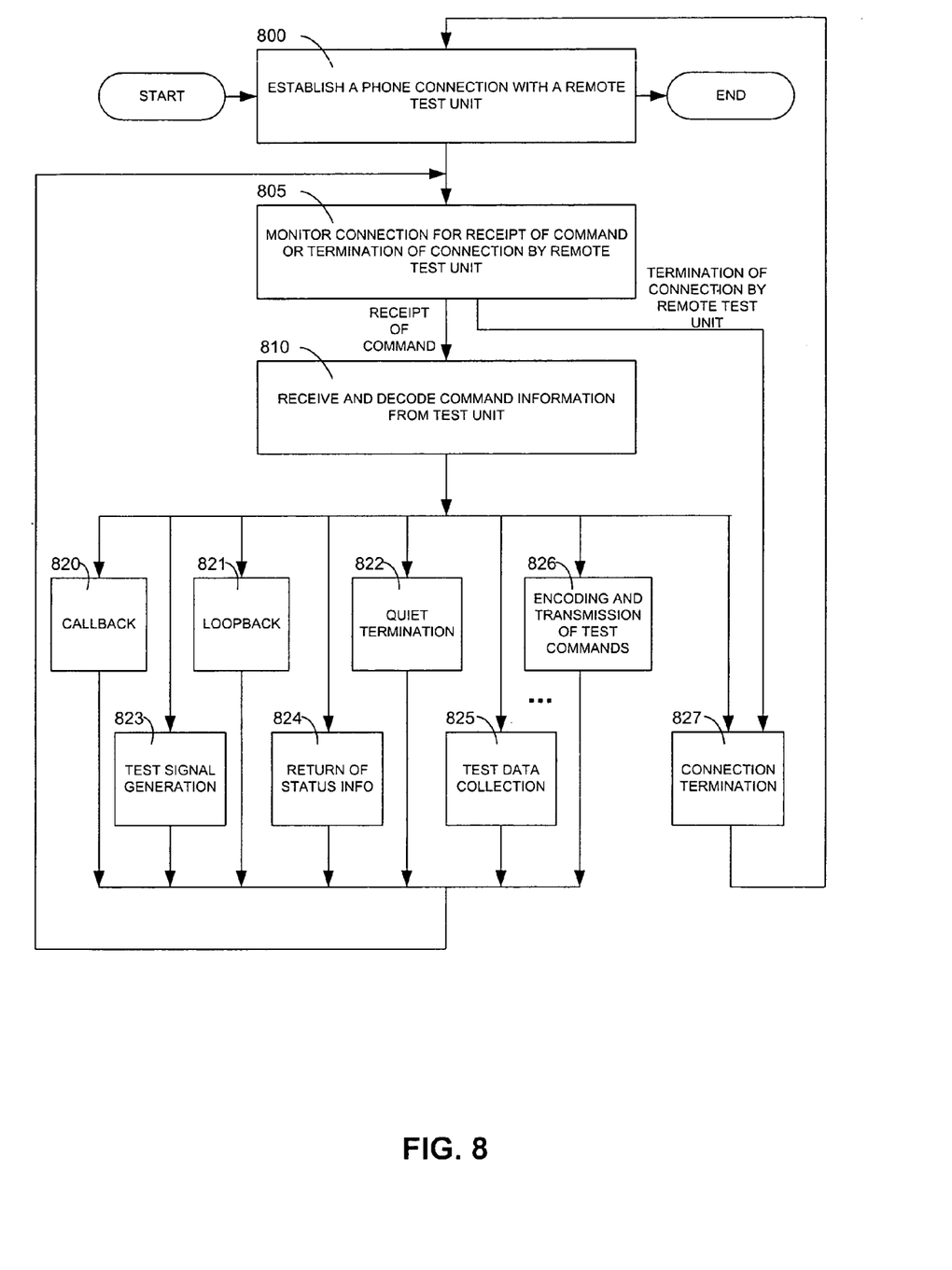
FIG. 8 is a flow chart of the steps involved in a method according to an embodiment of the invention.

Another embodiment of the invention is a method of providing remote voice quality testing of phone connections utilizing digital data networks. FIG. 8 provides a flow chart of the steps involved in performing the functions associated with voice quality testing according to an embodiment of the invention. The first step (step 800) is to establish a phone connection with a remote voice quality test unit that is capable of transmitting test commands, generating audio test signals, and receiving status information concerning the execution of voice quality tests. Once this has been accomplished, the connection is monitored to determine if the remote test unit is issuing a test command over the phone line, or if the remote test unit has terminated the connection (step 805). If the remote test unit terminates the connection, the line is dropped, completing the termination of the connection (step 826). If the remote test unit issues a test command, that command is received over the phone connection and decoded in order to determine any further action to be taken (step 810). Any information transmitted or received over the phone connection will be in some format compatible with the phone system to be tested, including, but not limited to, DTMF.

The commands requested by the remote test unit are then executed. Such commands may include, but are not limited to, dialback (820), loopback (821), quiet termination (822), and test functions normally associated with the remote test unit, such as generation of audio test signals (823), return of current testing status (824), and collection of test data (825). In one embodiment, the test commands include the encoding and transmission of test commands (826) to be issued to other remote test units. In another embodiment, an explicit command to terminate the connection (827) is also issued by the remote test unit. It may be noted that the ellipses shown in FIG. 7 indicate that other commands applicable to voice quality testing may also be included in the disclosed method. With respect to the dialback operation, the resulting call may be to the originating remote test unit or another remote test unit with similar capability. This process basically repeats until there are no more commands from the remote test unit remaining to be executed, and either the remote test unit terminates the connection itself, or explicitly issues a command to terminate the connection.

From the foregoing, it will be apparent that the invention provides a useful and effective apparatus and method for voice quality testing of telephone connections, particularly those connections utilizing digital data networks. Embodiments of the invention allow initiation of calls from remote locations without the need of a remote operator, thus allowing testing of a phone connection that has been initiated from either end. Furthermore, testing of phone connections, each end of which is geographically distant from an operator, may now be accomplished, resulting in fully remote testing.

What is claimed is:

1. A slave test unit comprising:

first and second phone line connectors attached to first and second phone lines, respectively, each of the first and second phone lines allowing communications to and from the slave test unit over the respective phone line, and each of the first and second phone lines being connected to a digital data network so that communications transmitted via packets through the digital data network are transmitted between the digital data network and the slave test unit over the respective phone line;

means for transmitting and receiving electrical signals as communications via the first and second phone line connectors over the first and second phone lines, respectively, the electrical signals being transmitted and received as communications between the slave test unit and a remote test unit through the digital data network, electrical signals received by the slave test unit from the remote test unit comprising test commands;

means for decoding the test commands from the electrical signals received from the remote test unit; and means for executing the test commands, the executing means including the ability to generate test signals on either of the first and second phone lines, the test commands being received exclusively from the remote test unit, to thereby test voice signal quality of voice calls transmitted through the first and second phone lines and as packets through the digital data network.

2. The slave test unit of claim 1, further comprising means for encoding the test commands into the electrical signals sent via the first and second phone line connectors to the remote test unit.

3. The slave test unit of claim 1, wherein one of the test commands is a dialback command.

4. The slave test unit of claim 1, wherein one of the test commands is a loopback command.

5. The slave test unit of claim 1, wherein one of the test commands is a quiet termination command.

6. The slave test unit of claim 1, wherein the remote test unit is a master test unit possessing a human operator interface.

7. The slave test unit of claim 1, wherein the remote test unit is another slave test unit.

8. The slave test unit of claim 1, wherein the test commands are encoded and received as DTMF signals.

9. The slave test unit of claim 1, wherein at least one of the first and second phone line connectors is adapted for FXO/FXS telephone ports.

10. The slave test unit of claim 1, wherein at least one of the first and second phone line connectors is adapted for E&M telephone ports.

11. A method comprising:

establishing first and second phone connections between a slave test unit and a remote test unit through a digital data network, the first and second phone connections being established over first and second phone lines, respectively, each of the first and second phone lines allowing communications to and from the slave test unit over the respective phone line, and each of the first and second phone lines being connected to the digital data network so that communications transmitted between the slave test unit and the remote test unit are transmitted via packets through the digital data network and are transmitted between the digital data network and the slave test unit over the respective phone line;

receiving electrical signals as communications by the slave test unit from the remote test unit via at least one of the first and second phone lines, the electrical signals comprising test commands;

decoding the test commands from the electrical signals by the slave test unit; and executing the test commands by the slave test unit, said executing including the ability to generate test signals on either of the first and second phone lines, the test commands being received exclusively from the remote test unit, to thereby test voice signal quality of voice calls transmitted through the first and second phone lines and as packets through the digital data network.

12. The method of claim 11, wherein one of the test commands executed in said executing is a dialback command.

13. The method of claim 11, wherein one of the test commands executed in said executing is a loopback command.

14. The method of claim 11, wherein one of the test commands executed in said executing is a quiet termination command.

15. The method of claim 11, wherein one of the test commands executed in said executing is an encoding and transmission of the test commands via at least one of the first and second phone connections.

16. The method of claim 11, wherein the remote test unit is a master test unit.

17. The method of claim 11, wherein the remote test unit is a slave test unit.

18. The method of claim 11, wherein the test commands of said receiving are encoded by the remote test unit as DTMF signals.

19. An apparatus comprising:

a slave test unit located on a phone company customer's premises and connected to a phone line via a phone jack, and connected to a digital data network via the phone line; and a remote test unit connected to the digital data network so that electrical signals are transmitted from the remote test unit to the slave test unit by traveling via packets through the digital data network and then over the phone line from the digital data network to the slave test unit, and so that electrical signals are transmitted from the slave test unit to the remote test unit by traveling from the slave test unit to the digital data network over the phone line and then via packets through the digital data network, wherein electrical signals transmitted from the remote test unit to the slave test unit in response to a call initiated from the remote test unit with the remote test unit positioned at an end point of the call include a test command indicating a test signal to be generated on the phone line by the slave test unit, and the slave test unit generates the test signal on the phone line in accordance with the test command, the apparatus thereby testing voice signal quality of voice calls transmitted through the phone line and as packets through the digital data network.

20. The apparatus of claim 19, wherein the test command is a dialback command.

21. The apparatus of claim 19, wherein the test command is a loopback command.

22. The apparatus of claim 19, wherein the test command is a quiet termination command.

23. The apparatus of claim 19, wherein the remote test unit is a master test unit possessing a human operator interface.

24. The apparatus of claim 19, wherein the remote test unit is another slave test unit.

25. The apparatus of claim 19, wherein the test command is encoded and received as a DTMF signal.

26. An apparatus comprising:

a slave test unit located on a phone company customer's premises and connected to a phone line via a phone jack, and connected to a digital data network via the phone line; and a remote test unit connected to the digital data network so that electrical signals are transmitted from the remote test unit to the slave test unit by traveling via packets through the digital data network and then over the phone line from the digital data network to the slave test unit, and so that electrical signals are transmitted from the slave test unit to the remote test unit by traveling from the slave test unit to the digital data network over the phone line and then via packets through the digital data network, electrical signals transmitted from the remote test unit to the slave test unit in response to a call initiated from the remote test unit with the remote test unit positioned at an end point of the call including a test command indicating a test signal to be generated on the phone line by the slave test unit, and means for generating the test signal by the slave test unit on the phone line in accordance with the test command, to thereby test voice signal quality of voice calls transmitted through the phone line and as packets through the digital data network.

* * * * *

UNITED STATES PATENT AND TRADEMARK OFFICE
CERTIFICATE OF CORRECTION

PATENT NO. : 7,068,757 B1 Page 1 of 1
APPLICATION NO. : 09/556503
DATED : June 27, 2006
INVENTOR(S) : Burnett It is certified that error appears in the above-identified patent and that said Letters Patent is hereby corrected as shown below:

On the Title page, in item (56), under "U.S. Patent Documents", in column 2, line 1, after "Lam" insert -- 375/222 --.

On the Title page, in item (56), under "Foreign Patent Documents", in column 2, line 1, delete "EP 144072 B1" and insert -- EP0144072 B1 --, therefor.

On the Title page, in item (56), under "Foreign Patent Documents", in column 2, line 1, after "11/1984" insert -- H04M 3/24 --.

On the Title page, in item (56), under "Foreign Patent Documents", in column 2, line 2, delete "EP 881855 A2" and insert -- EP0881855 A2 --, therefor.

On the Title page, in item (56), under "Foreign Patent Documents", in column 2, line 2, after "12/1998" insert -- H04Q 11/04 --.

Signed and Sealed this

Twenty-sixth Day of December, 2006

JON W. DUDAS
*Director of the United States Patent and Trademark Office*